United States Patent

[11] 3,586,384

| [72] | Inventor | Edward J. Falk |
| | | St. Louis, Mo. |
| [21] | Appl. No. | 841,045 |
| [22] | Filed | July 11, 1969 |
| [45] | Patented | June 22, 1971 |
| [73] | Assignee | Wagner Electric Corporation |
| | | Newark, N.J. |

[54] CONTROL VALVE
18 Claims, 4 Drawing Figs.

[52] U.S. Cl. ................................................. 303/6C,
60/54.5 E, 188/151 A, 188/349, 200/82 D, 303/84 A
[51] Int. Cl. ..................................................... B60t 8/26,
B60t 11/34, B60t 17/18
[50] Field of Search ........................................... 303/6, 6 C,
84, 84 A, 22, 22 A; 188/152, 152.11, 152.02, 151,
151.11; 60/54.5; 200/82

[56] References Cited
UNITED STATES PATENTS

| 3,463,556 | 8/1969 | Kersting | 188/152 X |
| 3,464,741 | 9/1969 | Falk | 188/152 X |
| 3,469,889 | 9/1969 | Bueler | 188/151 X |
| 3,472,559 | 10/1969 | Bueler | 188/151 X |
| 3,480,333 | 11/1969 | Stelzer | 303/6 |
| 3,482,884 | 12/1969 | Kersting | 188/152 X |

*Primary Examiner*—Milton Buchler
*Assistant Examiner*—John J. McLaughlin
*Attorney*—Joseph E. Papin ABSTRACT: A driver-warning-type control valve is provided with a passage connected in bypass relation with a proportioning valve, and a switch actuating piston for controlling said passage is movable between a normally centered position and opposed translated positions in response to separate fluid pressures supplied thereto and the proportionally reduced fluid pressure from the proportioning valve assisting one of the supplied fluid pressures. A centering piston is subjected to the other of the supplied fluid pressures and engageable with said switch actuating piston to normally urge said switch actuating piston toward its centered position and oppose movement thereof toward one of its opposed translated positions for opening the bypass passage. And a metering valve is also subjected to the other supplied fluid pressure for effecting a metered application thereof through said control valve.

INVENTOR
EDWARD J. FALK
BY
Joseph E. Papin

INVENTOR
EDWARD J. FALK

CONTROL VALVE

This invention relates in general to dual fluid pressure systems and in particular to driver warning valves utilized therein.

In the past, driver warning valves were utilized in dual brake systems to energize a driver warning lamp in the event of failure of one of the dual brake systems, and such driver warning valves have also been combined with either a proportioning valve for proportioning the fluid pressure delivered to the rear brakes or a metering valve for metering the fluid pressure delivered to the front brakes; however, one of the disadvantageous features of such past combination-type driver warning valves was that at least one of the proportioning and metering valves was a separate entity or unit from the combination-type warning valves. Of course, such separation not only affected the cost of manufacturing the valves per se but also the cost of assembly on the vehicle, and the utilization of such separate valve units also poses a space factor problem in assembly on the vehicle since the under-the-hood space in modern vehicles is becoming quite critical. Another disadvantageous or undesirable feature of such past separate valve units was that the inherent characteristics, such as structural arrangements and/or operational features indigenous to each, were not effectively combined or interrelated. Still another disadvantageous or undesirable feature of such past warning valves which utilized a bypass for the proportioning valve was that the effective areas on the translatory actuating piston for the driver warning switch could not be subjected to the altered or proportioned output fluid pressure of the proportioning valve. Another disadvantageous or undesirable feature of the past warning valves which utilized a metering valve was that such metering valves did not fully perform the intended function thereof. In other words, the metering valves were provided with fluid pressure compensating means to obviate the effect of volumetric changes in the pressure fluid on the downstream side of said metering valve in response to temperature variations; however, since the compensation means were pressure responsive, it is, of course, apparent that there was an undesirable fluid pressure established downstream of the metering valve and effective on the brakes prior to the actual metering actuation of said metering valve.

The primary object of the present invention is to provide a control valve which overcomes the aforementioned undesirable or disadvantageous features; and this, as well as other objects and advantageous features of the present invention, will become apparent hereinafter.

Briefly, the invention comprises a control valve having a housing with passage means therein for connection in bypass relation with a proportioning valve, means for controlling said passage means and movable between a centered position and opposed translated positions in response to separate fluid pressures supplied thereto and the proportionally reduced fluid pressure from said proportioning valve in assisting relation with one of the supplied fluid pressures, and centering means responsive to the other supplied fluid pressure for urging said first named means toward its centered position and against movement toward one of its opposed translated positions for opening said passage means. Another aspect of the present invention includes a proportioning valve in said housing responsive to the one supplied fluid pressure for effecting the proportionally reduced fluid pressure to which said first named means is subjected. And another aspect of the present invention includes a metering valve in said housing for effecting a metered application therethrough of the other of the supplied fluid pressures to which said first named means is subjected.

In the drawings, wherein like numerals refer to like parts wherever they occur:

Figure 1:
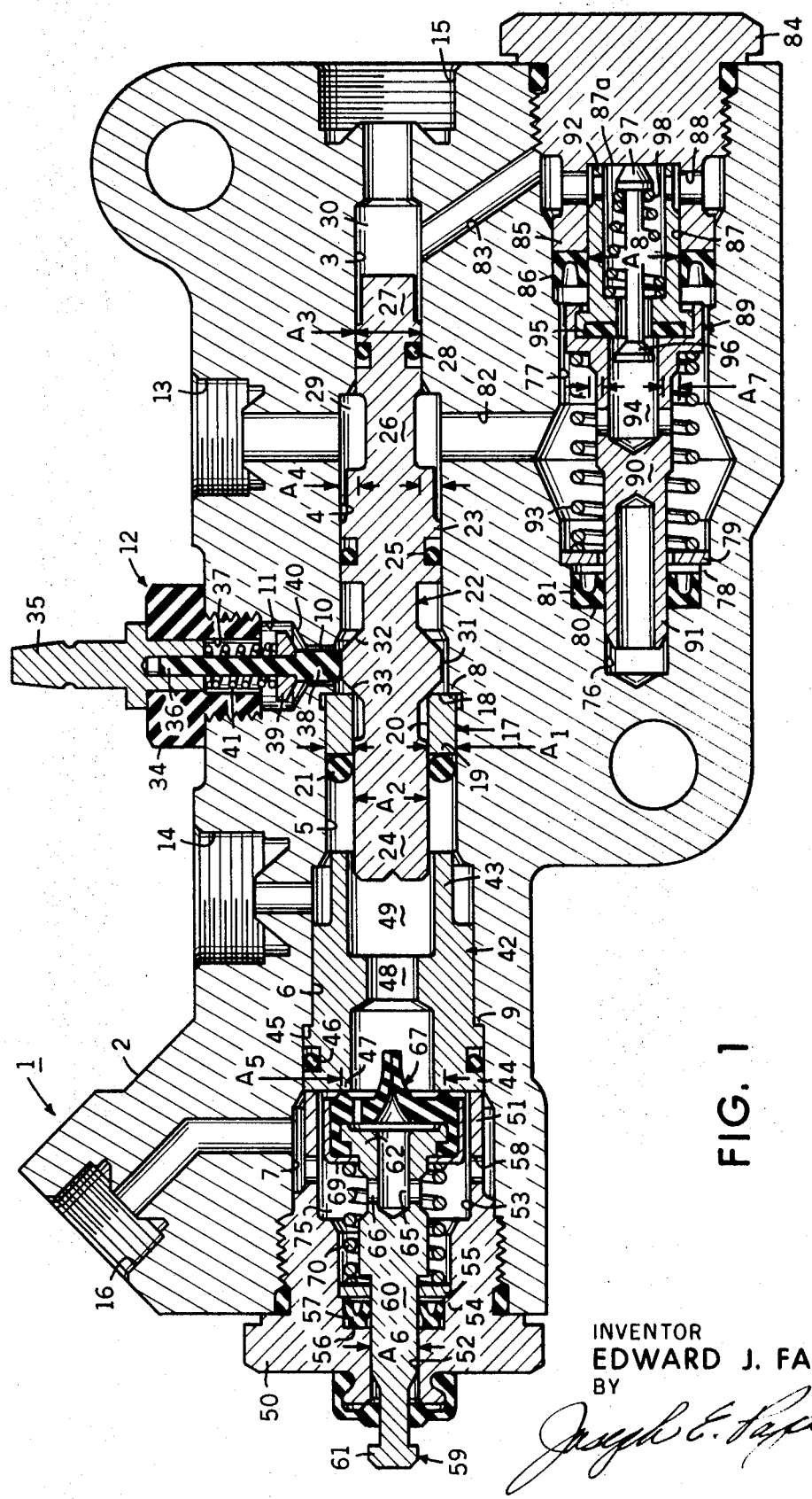
FIG. 1 is a sectional view illustrating a control valve embodying the present invention in cross section.

Referring now to the drawing in detail, a control valve 1 is provided with a housing 2 having a bore 3 therein aligned with stepped counterbores 4, 5, 6 and 7, and shoulders 8, 9 are provided on said housing between said counterbores 4, 5 and 6, 7, respectively. A cross bore and cross counterbore 10, 11 are also provided in the housing 2, said cross bore intersecting with the counterbore 4 and said cross counterbore being threaded at its open end to threadedly receive an electrical switch, indicated generally at 12 (to be discussed in detail hereinafter). Inlet ports 13, 14, which are adapted for connection with separate fluid pressure-generating chambers of a tandem or split system master cylinder (not shown), are provided in the housing 2 intersecting with the counterbores 4, 6, respectively, and outlet ports 15, 16, which are adapted for connection with rear drum brakes and front disc brakes of conventional types, are also provided in said housing intersecting with the bore 3 and counterbore 7, respectively.

A centering piston, indicated generally at 17, is slidably received in the counterbore 5 having opposed ends or abutment surfaces 18, 19, and an axially extending bore 20 is provided through said centering piston between said opposed ends thereof. An O-ring seal 21 is sealably engaged between the counterbore 5 and the leftward end 19 of the centering piston 17, and the rightward opposed end 18 thereof is normally engaged with the housing shoulder 8, said O-ring and leftward end of said centering piston defining an annular effective area $A_l$ subjected to the fluid pressure at the inlet port 14 at all times.

A reciprocal switch-actuating member or piston, indicated generally at 22, is shown in its centered or normal operating position in the housing 2 having spaced opposed annular flanges or end portions 23, 24 thereon. The switch piston flange 24 is slidably received in the centering piston bore 20 and extends through the O-ring 21 in sealing engagement therewith into the housing counterbore 5, and the sealing engagement of said flange and O-ring defines an effective area $A_2$ on said flange subjected to the fluid pressure at the inlet port 14 at all times. The switch piston flange 23 is slidably received in the housing counterbore 4 between the cross bore 10 and inlet port 13, and a peripheral seal 25 is carried in said flange in sealing engagement with said housing counterbore. An extension 26 is integrally connected with the piston flange 23 having a rightward or free end portion 27 slidably received in the housing bore 3, and a peripheral seal or valve element 28 is carried in said free end portion in sealing engagement with said housing bore and normally interrupting pressure fluid communication between the inlet and outlet ports 13, 15. An inlet chamber 29 is defined in the housing counterbore 4 between the piston flange 23 and the extension end portion 27, and an outlet chamber 30 is defined in the housing bore 3 between said extension end portion and the outlet port 15, said housing bore 3 defining a bypass passage between the inlet and outlet ports 13, 15. The sealing engagement of the seal 28 with the housing bore 3 defines an effective area $A_3$ on the extension free end 27 which is subjected to the fluid pressure at the outlet port 15 when the switch piston 22 is in its centered position, and another annular effective area $A_4$ is provided on the piston flange 23 being subjected to the fluid pressure at the inlet port 13 at all times, said area $A_4$ being substantially defined by the difference between the cross-sectional sealing areas of the seals 25, 28. It should be noted that areas $A_1$ and $A_2$ are additive and opposed to areas $A_3$, $A_4$, which are also additive, and areas $A_2$, $A_4$ are substantially equal while area $A_1$ is greater than area $A_3$. The switch piston 22 is also provided with a switch positioning portion or land 31 which is positioned beneath the housing cross bore 10 when said switch piston is in its centered position (as shown), and peripheral cam faces 32, 33 are also provided on said switch piston on opposite sides of said land, said cam face 33 also providing an abutment for engagement with the rightward end 18 of the centering piston 17.

The switch 12, as previously mentioned, includes a nonconductive closure or plug member 34 threadedly received in the housing cross counterbore 11, and a metal terminal 35 extends through said plug member being insulated therefrom, said terminal having an exterior end for connection in an electrical circuit of a type well known to the art for selectively energizing a driver warning or dash lamp (not shown). A nonconductive switch member 36 is slidably received in a bore 37 provided in said plug member 34, said switch member having a lower end or follower portion 38 extending through the housing cross bore 10 for engagement with the piston land 31 and having a conductive contact 39 on the upper portion thereof for electrical engagement with another contact 40 on said housing. A current-carrying spring 41 is interposed between the interior end of the terminal 35 and the switch member contact 39 urging the follower portion 38 of the switch member 36 into positioning engagement with the switch piston land 31.

A spacer member 42 having opposed ends 43, 44 with an annular shoulder 45 therebetween is received in the housing counterbores 6, 7 with said shoulder engaged with the housing shoulder 9, and a peripheral seal 46 is carried on said spacer member in sealing engagement with the housing counterbore 7. The rightward end 43 of the spacer 42 extends coaxially into the housing counterbore 5 defining an abutment to prevent the displacement of the seal 21 therefrom, and a valve seat 47 is defined on the spacer leftward end 44 about a passage 48 connected between said spacer ends 43, 44. Another inlet chamber 49 is defined in the housing counterbores 5, 6 between the spacer 42 and the seal 21 and switch piston flange 24, said inlet chamber being connected in open pressure fluid communication with the inlet port 14 and the spacer passage 48 at all times.

A closure member or end plug 50 is threadedly received in the leftward end of the housing counterbore 7 and has a reduced extension 51 connected in abutting displacement preventing engagement with the spacer leftward end 44. The closure member 50 is provided with an axial bore 52 aligned with a stepped counterbore 53 having an annular shoulder 54 in seating engagement with an annular spring retainer 55, and another shoulder 56 is provided on said closure member between said bore and counterbore in seating engagement with an annular seal 57. A plurality of cross passages 58 are provided through the closure member extension 51 connecting the closure member counterbore 53 in open pressure fluid communication with the outlet port 16 at all times.

Figure 2:
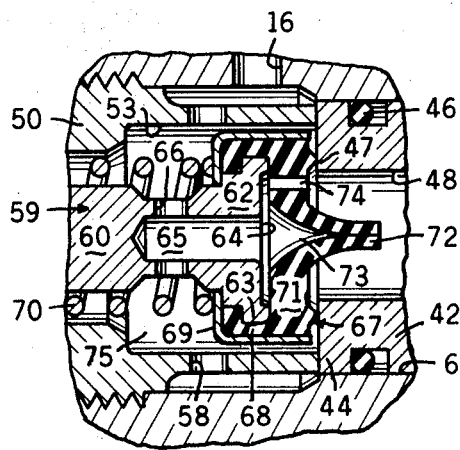
FIG. 2 is an enlarged fragmentary view taken from FIG. 1.

A metering valve, indicated generally at 59, is provided with a stem portion 60 slidably received in the closure member bore 52 in sealing engagement with the seal 57 and having an exterior or manually operable end 61 extending exteriorly of the closure member 50, and an interior end 62 of said stem portion extends coaxially into the closure member counterbore 53 having a radially extending flange or head portion 63 thereon, FIG. 2. An annular recess or seat 64 is provided in the stem interior end, and an axially extending passage 65 has one end intersecting with said recess and the other end thereof connecting with a cross passage 66. A resilient valve member or element, indicated generally at 67, is provided with an annular outer or sleeve portion 68 which is received on the stem head 63 and retained thereon against displacement by a cupshaped retainer 69, and a valve spring 70 interposed between the retainers 55, 69 normally urges stem and valve member 60, 67 rightwardly to engage said valve sleeve portion with the spacer valve seat 47. The valve member 67 is also provided with a radially extending diaphragm portion 71 integrally formed with the sleeve portion 68 and substantially contiguous with the stem interior end 62 adjacent to the stem recess 64. The diaphragm portion 71 is provided with integrally formed and centrally located expandable lips 72 which are normally sealably engaged and define a normally closed return flow passage 73 through the valve member 67 between the stem passage 65 and the spacer member passage 48. A plurality of compensating ports or passages 74 are also provided through the diaphragm portion 71 being radially positioned between the sleeve portion 68 and the return flow passage 73 thereof, and said compensating passages are normally connected in open pressure fluid communication between the stem passage 65 and spacer member passage 48 to accommodate volumetric changes in the pressure fluid in response to temperature variations; however, said diaphragm portion 71 is deformable or movable into sealing engagement with the recess 64 to close said compensating passages in response to a predetermined rate of pressure fluid flow therethrough, as discussed in detail hereinafter. When sealably engaged with the spacer valve seat 47, the valve 67 interrupts pressure fluid communication between the inlet chamber 49 and another outlet chamber 75 defined in the closure member counterbore 53 and the housing counterbore 7 and in open pressure fluid communication with the outlet port 16 at all times. It should be noted that the sealing engagement of the valve member 67 with the spacer valve seat 47 defines an effective area $A_5$ on said valve member which is subjected to the fluid pressure at the inlet port 14, and the sealing engagement of the stem 60 with the seal 56 defines another effective area $A_6$ on said stem subjected to the atmosphere.

A blind bore 76 is also provided in the housing 2 and aligned with a stepped counterbore 77 having a shoulder 78 therein in seating engagement with an annular spring retainer 79, and another shoulder 80 is provided in said housing between said blind bore and stepped counterbore and in seating engagement with an annular seal 81. A connecting passage 82 is provided in the housing 2 having one end connected with the inlet chamber 29 and the other end thereof intersecting with the housing counterbore 77 adjacent to the midportion thereof, and another connecting passage 83 is also provided in said housing having one end connected with the outlet chamber 30 and the other end thereof intersecting with said housing counterbore adjacent to its rightward end. Another closure member 84 is threadedly received in the rightward end of the housing counterbore 77 having an extension 85 extending into said housing counterbore and defining a seat for another annular seal 86 sealably engaged with said extension and said housing counterbore between the connecting passages 82, 83. A blind bore 87 having an end wall 87a is provided in the closure member extension 85 substantially coaxial with the housing counterbore 77, and a plurality of cross passages 88 are also provided through said closure member extension connecting said blind bore with the connecting passage 83.

A proportioning valve, indicated generally at 89, is provided with a piston or body portion 90 having opposed end portions 91, 92. The proportioning piston end 91 extends through the seal 81 in sealing engagement therewith and is slidably received in the housing blind bore 76, and the proportioning piston end 92 extends through the seal 86 in sealing engagement therewith and is slidably received in the closure member blind bore 87. A metering or proportioning spring 93 is biased between the retainer 79 and the proportioning piston end 92 urging said proportioning piston end toward abutting engagement with the closure member wall 87a. A passage 94 is provided in the proportioning piston 90 having one end connected in pressure fluid communication with the connecting passage 82 through the housing counterbore 77 and the other end connected in pressure fluid communication with the connecting passage 83 through the closure member blind bore 87, the cross passages 88 and said housing counterbore, and a valve seat 95 is provided on said proportioning piston about the passage 94. A valve 96 is movable in the proportioning piston passage 94 and normally disengaged from the valve seat 94, and a stem 97 is integrally formed with said valve extending through said valve seat and normally urged into abutting engagement with the closure member wall 87a by a valve spring 98 biased between the proportioning piston 90 and said stem. To complete the description of the control valve 1, it should be noted that the proportioning piston 90 is provided with an effective input area $A_7$ which is substantially equal to the difference between the cross-sectional areas of the sealing engagement of the proportioning piston end portions 91, 92 with the seals 81, 86, respectively, and the sealing engagement of said proportioning piston end portion 92 with the seal 86 defines an effective output area $A_8$ on said proportioning piston and opposed to the area $A_7$, said areas $A_7$, $A_8$ being respectively subjected to the fluid pressure at the inlet and outlet ports 13, 15.

In the operation with the component parts of the control valve 1 in their normal operating positions as shown in the drawings and as described hereinbefore, assume that substantially equal and separate input or supplied fluid pressures $P_1$, $P_2$ are transmitted from the separate fluid-pressure-generating chambers of the split master cylinder (not shown) to the inlet ports 13, 14 of said control valve. The supplied fluid pressures $P_1$, $P_2$ flow from the inlet ports 13, 14 into the inlet chambers 29, 49, respectively, acting on the switch piston areas $A_4$, $A_2$ to establish substantially equal and opposite forces $P_1A_4$ and $P_2A_2$, and the supplied fluid pressure $P_2$ also acts on the effective area $A_1$ of the seal 21 to establish another force $P_2A_1$ urging the centering piston 17 toward abutting engagement with the housing shoulder 8 and the switch piston 22. The supplied fluid pressure $P_1$ is applied from the inlet chamber 29 through the connecting passage 82, the housing counterbore 77, the proportioning piston passage 94 and the bore 87 and cross passages 88 of the closure member 84 into the connecting passage 83 and therefrom through the housing bore 3 and the outlet chamber 30 to the outlet port 15 to establish an output or applied fluid pressure $P_{10}$, said outlet port being connected with the rear brakes (not shown). Since the supplied and applied fluid pressures $P_1$, $P_{10}$ are substantially equal or in a 1:1 proportion through the range OR, as shown on the line ORS in the graph of FIG. 3, the applied fluid pressure $P_{10}$ in the outlet chamber 30 acts on the effective area $A_3$ of the switch piston 22 to establish a force $P_{10}A_3$ which is additive to the force $P_1A_4$; however, since the centering piston area $A_1$ is greater than the switch piston area $A_3$ and the fluid pressures $P_1$, $P_2$ are substantially equal, the force $P_2A_1$ is greater than the force $P_{10}A_3$ so that the switch piston 22 will remain in its centered position against translatory leftward movement. Since the areas $A_2$, $A_4$ are substantially equal, it is apparent that the additive forces $P_{10}A_3$ and $P_1A_4$ are greater than the opposing force $P_2A_2$ to obviate rightward translatory movement of the switch piston 22 from its centered position.

The supplied fluid pressure $P_1$ acts on the input effective area $A_7$ of the metering piston 90 to establish an input force $P_1A_7$, and the output fluid pressure $P_{10}$ acts on the output effective area $A_8$ of said metering piston to establish an output force $P_{10}A_8$ in opposition to the input force $P_1A_7$. Since the supplied and applied fluid pressures $P_1$ and $P_{10}$ are initially equal, as previously mentioned, and since the area $A_8$ is greater than the area $A_7$ of the metering piston 90, it is obvious that the output force $P_{10}A_8$ is greater than the input force $P_1A_7$; however, the compressive force Fc of the proportioning spring 93 prevents movement of the metering piston 90 until the supplied and applied fluid pressures $P_1$, $P_{10}$ exceed the predetermined value R, as shown by the line OR in the graphical representation of FIG. 3. When the predetermined value R of the supplied and applied fluid pressures $P_1$, $P_{10}$ is attained, the output force $P_{10}A_8$ overcomes the additive input and spring forces $P_1A_7$, Fc to move the metering piston 90 from its original or disabled position in a leftward direction toward an operative or metering position to store the energy of the spring 93. This leftward movement of the metering piston 90 engages the valve seat 94 thereof with the valve member 96 to isolate the supplied fluid pressure $P_1$ from the applied fluid pressure $P_{10}$.

Figure 3:
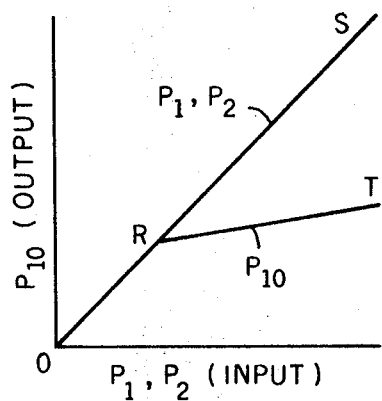
FIG. 3 is a graphical representation of the applied fluid pressure effected by the proportioning valve of FIG. 1 in response to the input fluid pressure supplied thereto.

From the graphical representation in FIG. 3, it is obvious that increases in the magnitude of the supplied fluid pressure $P_1$ in excess of the predetermined value R, as shown by the line RS, will result in proportionally reduced increases in the output fluid pressure $P_{10}$, as shown by the line RT. For instance, when the input fluid pressure is increased to a value in excess of the predetermined value R, the input force $P_1A_7$ is correspondingly increased and additive to the spring force Fc to overcome the output force $P_{10}A_8$; therefore, the metering piston 90 is moved rightwardly toward a metering position disengaging the valve seat 94 from the valve member 96 to effect a metered application of the increased supplied fluid pressure $P_1$ through the metering piston passage 94, the closure member bore 87 and cross passages 88, the housing passage 83 and the outlet chamber 30 to the outlet port 15 to effect a proportional or ratioed increase in the applied fluid pressure $P_{10}$, as shown by the line RT in the graph of FIG. 3 wherein $$P_{10} = \frac{P_1 A_7 + Fc}{A_8}$$

Of course, the increased applied fluid pressure $P_{10}$ effects a corresponding increase in the output force $P_{10}A_8$, and when the increased output force $P_{10}A_8$ attains an increased value substantially equal to that of the increased input force $P_1A_7$ and the additive spring force $Fc$, the metering piston 90 is again moved leftwardly toward its isolating position reengaging the valve seat 94 thereof with the valve member 96 to again isolate the increased supplied and applied fluid pressures $P_1$, $P_{10}$. It is, of course, obvious that the metering piston 90 will be responsive to further increases in the supplied fluid pressure $P_1$ to effect further corresponding proportional increases in the applied fluid pressure $P_{10}$ in the same manner as previously described. It should also be noted that as the supplied fluid pressure $P_1$ is increased, the separate supplied fluid pressure $P_2$ is also substantially equally increased to maintain the balance between the opposing forces $P_1A_4$ and $P_2A_2$ acting across the switch piston 22 and to increase the force $P_2A_1$ acting on the centering piston to compensate for the increased force $P_{10}A_3$ acting on said switch piston.

When the split master cylinder is deactuated, the supplied fluid pressures $P_1$, $P_2$ are vented to atmosphere which eliminates the forces $P_1A_4$, $P_2A_1$ and $P_2A_2$ acting on the centering and switch pistons 17, 22, as well as the input force $P_1A_7$ acting on the metering piston 90, and the output fluid pressure $P_{10}$ acting on the effective area of the valve member 96 moves said valve member against its spring 98 toward an open position disengaged from the valve seat 94. In this manner, the applied fluid pressure $P_{10}$ is eliminated or vented from the outlet port 15 through the outlet chamber 30, the housing passage 83, the closure member cross passages and bore 88, 87, the proportioning piston passage 94 and the housing counterbore 77 to the housing passage 82 and therefrom through the inlet chamber 29 to the inlet port 13. Upon the elimination of the output fluid pressure $P_{10}$, the force $P_{10}A_3$ acting on the switch piston is eliminated, and, of course, the output force $P_{10}A_8$ is also eliminated; therefore, the compressive force Fc of the metering spring 93 will return the metering piston 90 to its original position.

In the event that the supplied fluid pressure $P_2$ fails due to leaks or the like, it is apparent that the forces $P_2A_1$, $P_2A_2$ are eliminated and the forces $P_1A_4$, $P_3A_3$ acting on the switch piston 22 are effective to urge said switch piston leftwardly toward its leftward translated position. The leftward translatory movement of the switch piston 22 concertedly drives the centering piston 17 and seal 21 therewith until the switch piston flange 24 engages the spacer member 42 which defines the leftward translatory position of said switch piston. The leftward translatory movement of the switch piston 22 in response to the sustained forces $P_1A_4$, $P_{10}A_3$ also moves at least a portion of the switch piston extension free end 27 from the housing bore 3 into the housing counterbore 4, and the seal 28 is moved leftwardly therewith toward a position in the housing counterbore 4 and disengaged from the housing bore 3 to open said housing bore in bypass relation between the inlet and outlet chambers 29, 30 and established pressure fluid flow from the inlet port 13 through said inlet chamber, said housing bore and said outlet chamber to the outlet port 15 in bypass relation to the proportioning valve 89 to effect energization of the rear brakes. Therefore, upon the failure of the supplied fluid pressure $P_2$, it is obvious that the supplied fluid pressure $P_1$ is transmitted directly from the inlet port 13 to the outlet port 15 to effect full energization of the rear brakes, and also that the proportioning valve 89 is bypassed or shunted to obviate the proportioning or altering effect thereof on the magnitude of the applied fluid pressure $P_{10}$ normally delivered to the outlet port 15.

The leftward translatory movement of the switch piston 22 upon the failure of the supplied fluid pressure $P_2$, as above described, moves the piston land 31 leftwardly toward a position disengaged from the lower end of the switch member follower portion 38, and the compressive force of the switch spring 41 moves the switch-operating member 36 downwardly to engage the contact 39 thereof with the housing contact 40. In this manner, the engagement of the switch-operating member contact 39 with the housing contact 40 energizes a driver warning lamp (not shown). When the malfunction has been corrected in order to reestablish the supplied fluid pressure $P_2$, the reestablished supplied fluid pressure $P_2$ again acts on the effective areas $A_1$, $A_2$ of the centering and switch pistons 17, 22 to reestablish the forces $P_2A_1$, $P_2A_2$ which are effective to return said centering and switch pistons toward their normal positions against the opposing additive forces $P_1A_4$, $P_1A_3$ acting on said switch piston. Upon the return movement of the centering and switch pistons 17, 22 toward their normal positions in response to the reestablishment of the supplied fluid pressure $P_2$, the cam surface 32 of the switch piston is engaged with the lower end of the switch member follower portion 38 and cams or drives the switch member 36 upwardly to disengage the switch member contact 39 from the housing contact 40 thereby deenergizing the driver warning dash lamp (not shown), and with said switch piston returned to its normal or centered position, the land 31 thereof is again in positioning engagement with the switch member follower portion 38.

In the event that the supplied fluid pressure $P_1$ fails due to leaks or the like, it is apparent that the forces $P_1A_4$, $P_{10}A_3$ acting on the switch piston 22 are eliminated along with the forces $P_1A_7$ and $P_{10}A_8$ which, of course, renders the proportioning valve 89 inoperative. Upon the elimination of the forces $P_1A_4$, $P_{10}A_3$, the force $P_2A_2$ is effective to urge said switch piston rightwardly toward its rightward translated position independently of the centering piston 17 which is urged into abutting engagement with the housing shoulder 8 in response to the force $P_2A_1$. The rightward translatory movement of the switch piston 22 engages the switch piston extension free end 27 with the housing 2 rightwardly thereof and adjacent to the outlet port 15 which defines the rightward translated position of said switch piston. The rightward translatory movement of the switch piston 22 upon the failure of the supplied fluid pressure $P_1$, as above described, moves the piston land 31 rightwardly toward a position disengaged from the lower end of the switch member follower portion 38, and the compressive force of the switch spring moves the switch-operating member 36 downwardly to engage the contact 39 thereof with the housing contact 40. In this manner, the engagement of the switch-operating member contact 39 with the housing contact 40 energizes the driver warning lamp. When the malfunction has been corrected in order to reestablish the supplied fluid pressure $P_1$, the reestablished supplied fluid pressure $P_1$ also reestablishes the additive forces $P_1A_4$ and $P_{10}A_3$ which are effective to return the switch piston 22 toward its normal centered position against the lesser force $P_2A_2$; however, upon the engagement of the switch piston surface 33 with the centering piston 17 the force $P_2A_1$ is then additive to the force $P_2A_2$ and greater than the opposing additive forces $P_1A_4$, $P_{10}A_3$ to prevent the return movement of said switch piston past its centered position. Upon the leftward return movement of the centering piston 22, the cam surface 33 thereof engages the switch member follower portion 38 to cam or drive the switch member 36 upwardly toward its position disengaging the contact 39 thereon from the housing contact 40 which deenergizes the driver warning dash lamp, and with switch piston 22 in its centered position, the positioning land 31 thereof is in positioning engagement with the lower end of the switch member follower portion 38.

Referring now to the metering or inhibiting valve 59, the compensating ports 74 in the valve member 68 are normally connected in open pressure fluid communication between the inlet and outlet ports 14, 16 in order to accommodate volumetric changes in the fluid pressure at the outlet port 16 and the front brakes (not shown) in response to temperature variations when the valve member 68 is engaged with the spacer valve seat 47. The compensating ports 74 are responsive to a very low rate of pressure fluid flow which is occasioned in response to the initial establishment of the fluid pressure $P_2$ at the inlet port 14, i.e., at very low values or magnitudes of the supplied fluid pressure $P_2$. In other words, the initial low flow rate of the pressure fluid through the compensating passages 74 upon the establishment of the fluid pressure $P_2$ is effective to establish a relatively small pressure drop across the diaphragm portion 71 of the valve member 68 to move said diaphragm portion leftwardly into sealing engagement with the recess 64 of the stem 60 thereby closing the compensating ports 74. Therefore, it is apparent that the diaphragm portion 71 of the valve member 68 is actuated in response to a relatively small pressure drop occasioned at relatively low rates of pressure fluid flow which predeterminately maintains fluid pressure applied through the compensating ports 74 to an insignificantly low value obviating any appreciable effect thereof on the front brakes prior to the metering actuation of the metering valve 59 as described hereinafter.

Figure 4:
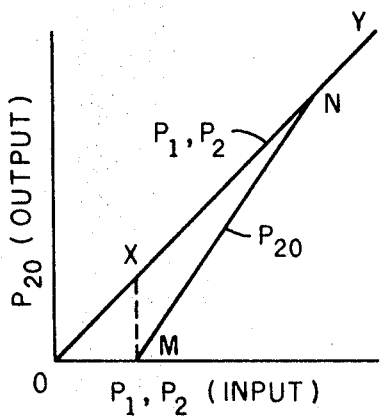
FIG. 4 is a graphical representation of the applied fluid pressure effected by the metering valve of FIG. 1 in response to the input fluid pressure supplied thereto.

Subsequent to the closure of the compensating ports 74, the magnitude of the supplied fluid pressure $P_2$ acting on the effective area $A_5$ of the valve member 68 is increased, and when the supplied fluid pressure $P_2$ attains a predetermined value to establish an input force $P_2A_5$ to overcome the compressive force Fm of the metering spring to the metering valve 60 is moved leftwardly against said spring to disengage said valve member from the spacer valve seat 47 to meter or apply fluid pressure through the outlet chamber 75 to the outlet port 16 and establish an output fluid pressure $P_{20}$ to the front conventional disc type brakes (not shown). It should be noted that this application is illustrated in the graphical representation in FIG. 4 along the line OXY wherein the point X represents the predetermined value of the supplied fluid pressure $P_2$ at which the valve member 68 is disengaged from the spacer seat 47, and the line MN represents the subsequent applied fluid pressure $P_{20}$ attained at the outlet port 16 in response to further increases in the supplied fluid pressure $P_2$ at the inlet port 14, wherein $$P_{2o}=\frac{P_2A_5-F_m}{(A_5-A_6)}$$

The applied fluid pressure $P_{20}$ so established at the outlet port 16 acts on the output effective area $A_5-A_6$ of the metering valve 60 creating an output force $P_{20}(A_5-A_6)$ additive to the metering spring force Fm and opposed to the input force $P_2A_5$, and when the applied fluid pressure $P_{20}$ is increased to a value wherein the output force $P_{20}(A_5-A_6)$ and the metering spring force Fm are substantially equal to or balance the opposing input force $P_2A_5$, the metering valve 59 is moved rightwardly to reengage the valve member 68 with the spacer seat 47 and interrupt pressure fluid communication between the inlet and outlet ports 14, 16. Of course, it is obvious from the foregoing that the metering spring force Fm acting on the metering valve 59 delays or impedes the application of the fluid pressure $P_2$ from the inlet port 14 to the outlet port 16 which delays the energization of the front disc-type brakes connected therewith until the magnitude of the supplied fluid pressure $P_1$ attains a value great enough for effecting energization of the rear shoe-type brakes, and it is also apparent that the differential between the magnitudes of the supplied fluid pressure $P_2$ at said inlet port and the applied fluid pressure $P_{20}$ at said outlet port is directly proportional to the compressive force Fm of the metering spring 70.

When the split master cylinder (not shown) is deactuated, the supplied fluid pressures $P_1$, $P_2$ are vented to atmosphere, as previously mentioned, which eliminates the input force $P_2A_2$ thereby establishing a pressure differential across the valve member 68 which is sealably engaged with the spacer valve seat 47. Upon the establishment of this differential, the applied fluid pressure $P_{20}$ returns from the outlet port 16 through the outlet chamber 75, the passage and cross passages 65, 66 in the valve stem 60 and therefrom through the return flow passage 73 of the valve member 68 effecting the opening or disengagement of the valve member sealing lips 72. The fluid pressure flows from the return flow passage 73 into the spacer member passage 48 and therefrom through the inlet chamber 49 to the inlet port 14. In this manner, the differential across the valve member 68 upon the elimination of the input force $P_2A_5$ effects the return flow of the displaced fluid pressure from the outlet port 16 to eliminate the output force $P_{20}(A_5-A_6)$, and at the same time, the diaphragm portion 71 of the sealing member 68 is disengaged from the stem recess 64 to again open the compensating passages 74. It should be noted that the return flow of the displaced fluid pressures $P_1$, $P_2$ to the inlet ports 13, 14 upon the deenergization of the split master cylinder, as described hereinbefore, effects substantially simultaneous deenergization of both the front and and rear brakes. It should also be noted that the metering valve 59 can be manually disabled for brake bleeding purposes wherein a manually applied force in the leftward direction on the exterior end 61 of the stem 60 moves said metering valve against the force Fm of the metering spring 70 to disengage the valve member 68 from the spacer valve seat 47 and establish open pressure fluid communication between the inlet and outlet ports 14, 16 to facilitate bleeding of the front brakes.

From the foregoing, it is now apparent that a novel control valve 1 meeting the objects and advantageous features set forth hereinbefore, as well as others, is provided and that changes as to the precise configuration, shapes and details of the construction set forth in the disclosure by way of illustration may be made by those skilled in the art without departing from the spirit of the invention.

The embodiments of the invention in which I claim an exclusive property or privilege are defined as follows:

1. A control valve comprising a housing, means for comparing the magnitudes of separate fluid pressures supplied thereto and movable from a normally centered position toward opposed translated positions in said housing in response to oppositely directed differentials in excess of a predetermined amount between the magnitudes of the supplied fluid pressures acting thereon, said means defining with said housing passage means for connecting one of the supplied fluid pressures in pressure fluid communication with a fluid pressure proportional to said one supplied fluid pressure in said passage means, a pair of additive areas on said first-named means and within said passage means respectively subjected to the one supplied fluid pressure and the proportional fluid pressure, an opposing area on said first named means opposed to said additive areas and subjected to the other of said supplied fluid pressures, said means being urged toward one of its translated positions against the other supplied fluid pressure acting on said opposing area in response to the one supplied fluid pressure and the proportional fluid pressure respectively acting on said additive areas to open said passage means and establish equalizing pressure fluid communication between said one supplied fluid pressure and the proportional fluid pressure when the differential between the magnitude of the one supplied fluid pressure in excess of that of the other supplied fluid pressure exceeds the predetermined amount, and only a single centering means movable in said housing for engagement with said housing and said first named means and subjected only to the other supplied fluid pressure, said single centering means being urged in response to the other supplied fluid pressure acting thereon toward engagement with said housing and with said first-named means to oppose movement thereof toward its one translated position when the differential between the magnitudes of the one and other supplied fluid pressures respectively acting on one of said additive areas and said opposing area is less than the predetermined amount.

2. A control valve according to claim 1, wherein said one additive area subjected to the one supplied fluid pressure is substantially equal to said opposing area.

3. A control valve according to claim 1, comprising another opposing area on said single centering means additive to said first-named opposing area and subjected only to the other supplied fluid pressure, said single centering means being urged toward engagement with said housing and with said first-named means to oppose movement thereof toward its one translated position in response to the other supplied fluid pressure acting on said other opposing area.

4. A control valve according to claim 3, wherein said other opposing area is greater than one of said one and other of said additive areas.

5. A control valve according to claim 3, wherein said one additive area subjected to the one supplied fluid pressure is substantially equal to said first-named opposing area, and said other opposing area is greater than the other of said additive areas.

6. A control valve comprising a housing means displaceable in said housing from a normal centered position toward opposed translated positions including first and second opposed areas respectively subjected to one and other separately supplied fluid pressures, a third area subjected to a fluid pressure proportional to said one supplied fluid pressure and additive to said first opposed area, passage means in said housing and subjected to said one supplied fluid pressure and said proportional fluid pressure, said first-named means being movable in said passage means for controlling pressure fluid communication therethrough between the one supplied fluid pressure and the proportional fluid pressure, said first-named means being urged toward one of its translated positions against the other of the supplied fluid pressures acting on said second opposed area in response to the one supplied fluid pressure and the proportional fluid pressure respectively acting on said first opposed area and said additive area to open said passage means and establish equalizing pressure fluid communication therethrough between the one supplied fluid pressure proportional fluid pressure when the magnitude of the one supplied fluid pressure exceeds that of the other other supplied fluid pressure by a predetermining value, and only one centering means movable in said housing for urging said first named means toward its centered position and for respective engagement with said housing including another additive area subjected only to the other supplied fluid pressure and additive to said second opposed area, said one centering means being urged toward engagement with said housing and said first-named means to oppose movement thereof toward the one translated position in response to the other supplied fluid pressure acting on said other additive area when the magnitude of the one supplied fluid pressure in excess of that of the other supplied fluid pressure is less than the predetermined value.

7. A control valve according to claim 6, wherein said first-named means includes opposed portions, and extension means on one of said opposed portions and movable in said passage means, said first opposed area being defined on said one opposed portion, said first named additive area being defined on said extension means, and said second opposed area being defined on the other of said opposed portions.

8. A control valve according to claim 6, wherein said first and second opposed areas are substantially equal, and said other additive area is greater than said first-named additive area.

9. A control valve according to claim 6, comprising abutment means on said housing for engagement with said one centering means, said one centering means being urged toward engagement with said abutment means in response to the other supplied fluid pressure acting on said other additive area.

10. A control valve according to claim 6, wherein said first-named means comprises a switch actuating piston having opposed ends, one of said opposed ends being slidable in said housing and including extension means slidable in said passage means, said one opposed area being defined on said one opposed end, and said first-named additive area being defined 61 said extension means.

--. A control valve according to claim 10, wherein said one centering means includes piston means slidable in said housing, the other of said opposed ends being slidable in piston means and extending coaxially therethrough, opposed portions on said piston means, said other additive area being defined on one of said opposed portions, abutment means on said housing for engagement with the other of said opposed portions, and other abutment means on said switch-actuating piston for engagement with said other opposed portions, said other opposed portion being urged toward engagement with said first-named and other abutment means in response to the other supplied fluid pressure acting on said other additive area.

12. A control valve comprising a housing having a pair of input chambers and another chamber therein, means for controlling pressure fluid communication between one of said input chambers and said other chamber and movable in said housing from a normal centered position toward opposed translated positions including a pair of opposed areas respectively subjected to the fluid pressures in said input chambers, and an additive area subjected to the fluid pressure in said other chamber which is proportional to the fluid pressure in said one chamber and additive to one of said opposed areas, said means being urged in one directing against fluid pressure in the other of said input chambers acting on the other of said opposed areas in response to the fluid pressure in said one input chamber and the proportional fluid pressure in said other chamber respectively acting on said one opposed area and said additive area toward a translated position in said housing establishing equalizing pressure fluid communication between said one input chamber and said other chamber, and only a single centering means movable in said other input chamber for engagement with said housing and with said first-named means for urging said first-named means toward its centered position including another additive area subjected only to the fluid pressure in said other input chamber and additive to said other opposed area, said single centering means being urged toward engagement with said housing and said first-named means to oppose movement thereof from its centered position to its translated position in the one direction in response to the fluid pressure in said other input chamber acting on said other additive area.

13. A control valve comprising a housing having three ports therein, means subjected to fluid pressures at said three ports and movable in said housing between a normally centered position and opposed translated positions for controlling pressure fluid communication between two of said ports, a pair of opposed areas on said first-named means, one of said opposed areas being subjected to the fluid pressure at said third port and the other of said opposed areas being subjected to the fluid pressure at one of said two ports, an additive area on said first-named means additive to said other opposed area and subjected to the fluid pressure at the other of said two ports proportional to the fluid pressure at said one of said two ports, said means being urged in one direction against fluid pressure at said third port acting on said one opposed area in response to fluid pressure at said one of said two ports acting on said other opposed area and fluid pressure at said other of said two ports proportional to that at said one of said two ports acting on said additive area, respectively, toward a translated position in said housing establishing equalizing pressure fluid communication between said two ports when the fluid pressure at one of said one and other of said two ports exceeds that at said third port by a predetermined value, only a single centering means movable in said housing for engagement with said housing and said first named means, and another additive area on said single centering means additive to said one opposed area and subjected to the fluid pressure at said third port, said single centering means being urged in response to the fluid pressure at said third port acting on said other additive area toward engagement with said housing and said first-named means to oppose movement of said first-named means in the one direction toward the displaced position thereof when the fluid pressure at said one of said one and other of said two ports in excess of that at said third port is lees than the predetermined value.

14. A control valve according to claim 13, wherein said one and other opposed areas are substantially equal, and said other additive area is greater than said first-named additive area.

15. A control valve according to claim 13, comprising passage means in said housing connected between said two ports, said first-named means including valve means movable in said passage means between positions respectively interrupting and establishing pressure fluid communication therethrough between said two ports, said valve means being movable toward its pressure fluid communication establishing position upon the movement of said first-named means in the one direction toward its translated position.

16. A control valve according to claim 13, comprising passage means in said housing connected between said two ports, said first-named means including extension means movable in said passage means, means in said passage means defining a valve seat, means on said extension means defining valve means movable between a position in sealing engagement with said valve seat to interrupt pressure fluid communication through said passage means between said ports and a position displaced from sealing engagement with said valve seat to establish pressure fluid communication through said passage means between said two ports, said valve means being movable toward its displaced position in concert with the movement of said first-named means in the one direction toward its translated position.

17. A control valve according to claim 16, wherein said first-named means comprises first piston means having opposed portions, one of said opposed portions being slidable in said housing, said extension means being connected with said one opposed portion and slidable in said passage means, said single centering means including second piston means slidable in said housing, and opposed ends on said second piston means, the other of said opposed portions being slidable in said second piston means and extending through said opposed ends thereof, said one and other opposed areas being on said other and said one opposed portions, respectively, said first-named additive area being on said extension means and subjected to the proportional fluid pressure at the other of said two ports when said valve means is sealably engaged with said valve seat, said other additive area being on one of said opposed ends of said second piston means, first and second abutment means on said housing and said first piston means for engagement with the other of said opposed ends, said other opposed end being urged toward engagement with said first and second abutment means in response to the fluid pressure at said third port acting on said other additive area.

18. A control valve comprising a housing having a bore therein, first and second stepped counterbores in said housing aligned with one end of said bore, a shoulder on said housing between said first and second counterbores, first, second and third fluid pressure ports in said housing respectively connected with said bore, said first counterbore, and said second counterbore, first piston means slidable in said second counterbore and including first and second opposed end portions, a first effective area defined on said first end portion for subjection to the fluid pressure at said third port, said second end portion being engageable with said shoulder, and another bore in said first piston means between said first and second end portions, second piston means movable in said housing between a normally centered position and opposed translated positions including third and fourth opposed end portions, said third end portion being slidable in said other bore and extending therethrough into said second counterbore, abutment means between said third and fourth end portions for engagement with said second end portion, the fluid pressure at said third port acting on said first area to normally urge said second end portion toward engagement with said housing shoulder and said abutment means, a second effective area on said third end portion additive to said first area and subjected to the fluid pressure at said third port, a third effective area on said fourth end portion opposed to said second area and subjected to the fluid pressure at said second port, extension means on said fourth end portion having a free end portion slidable in said first named bore, means on said free end portion defining valve means movable between a position in sealing engagement with said first-named bore to interrupt pressure fluid communication therethrough between said first and second ports and a position displaced from sealing engagement with said first-named bore to establish pressure fluid communication therethrough between said first and second ports, and a fourth effective area on said free end portion and subjected to fluid pressure at said first port which is predeterminately proportional to the fluid pressure at said second port when said valve means is in its sealing position, said first and second piston means being concertedly urged toward one of the translated positions of said second piston means against the fluid pressure at said third port acting on said first and second areas in response to the fluid pressure at said second port and the proportional fluid pressure at said first port respectively acting on said third and fourth areas to move said valve means toward its displaced position establishing equalizing pressure fluid communication between said first and second ports when the magnitude of the fluid pressure at said second port exceeds that of the fluid pressure at said third port by a predetermined value, and said second end portion of said first piston means being normally urged toward engagement with said housing shoulder and abutment means in response to the fluid pressure at said third port acting on said first area to oppose movement of said second piston means from its centered position toward its one translated position when the differential between the magnitude of the fluid pressure at said second port in excess of that of the fluid pressure at said third port is less than the predetermined value.

UNITED STATES PATENT OFFICE
CERTIFICATE OF CORRECTION

Patent No. 3,586,384            Dated June 22, 1971

Inventor(s) Edward J. Falk

It is certified that error appears in the above-identified patent and that said Letters Patent are hereby corrected as shown below:

Column 2, line 70, after "$A_4$" cancel the comma. Column 6, line 60, "$P_3 A_3$" should read -- $P_{10} A_3$ -- . Column 8, line 39, "to" should read -- 70, -- . Column 9, line 27, cancel "and", first occurrence. Column 10, line 26, after "housing" insert a comma -- , -- ; line 45, after "pressure" insert -- and the -- ; line 47, cancel "other", first occurrence; line 48, "predetermining" should read -- predetermined -- . Column 11, line 8, "61" should read -- on -- ; line 12, after "in, insert -- said -- ; line 34, "directing" should read -- direction -- . Column 12, line 11, "lees" should read -- less -- .

Signed and sealed this 1st day of May 1973.

(SEAL)
Attest:

EDWARD M. FLETCHER, JR.  
Attesting Officer

ROBERT GOTTSCHALK  
Commissioner of Patents